B. A. SHEARER.
Grain Drill.

No. 69,848

Patented Oct. 15, 1867.

Witnesses:
Theo. Fusche
Wm. Trewin

Inventor:
B. A. Shearer
per Munn & Co.
Attys

United States Patent Office.

B. A. SHEARER, OF CROWN POINT CENTRE, NEW YORK.

Letters Patent No. 69,848, dated October 15, 1867.

---

IMPROVEMENT IN SEEDING MACHINE.

---

The Schedule referred to in these Letters Patent and making part of the same.

---

TO ALL WHOM IT MAY CONCERN:

Be it known that I, B. A. SHEARER, of Crown Point Centre, in the county of Essex, and State of New York, have invented a new and improved Seeding Machine; and I do hereby declare that the following is a full, clear, and exact description thereof, which will enable others skilled in the art to make and use the same, reference being had to the accompanying drawings, forming part of this specification.

This invention relates to a new and improved machine for sowing seed broad-cast, and it consists of a revolving grooved cylinder, arranged or applied in a novel way, and using in connection with the same a series of harrow or covering-teeth, all being applied to a frame mounted on wheels, and provided with a seed-hopper, as hereinafter fully shown and described. In the accompanying sheet of drawings—

Figure 1:
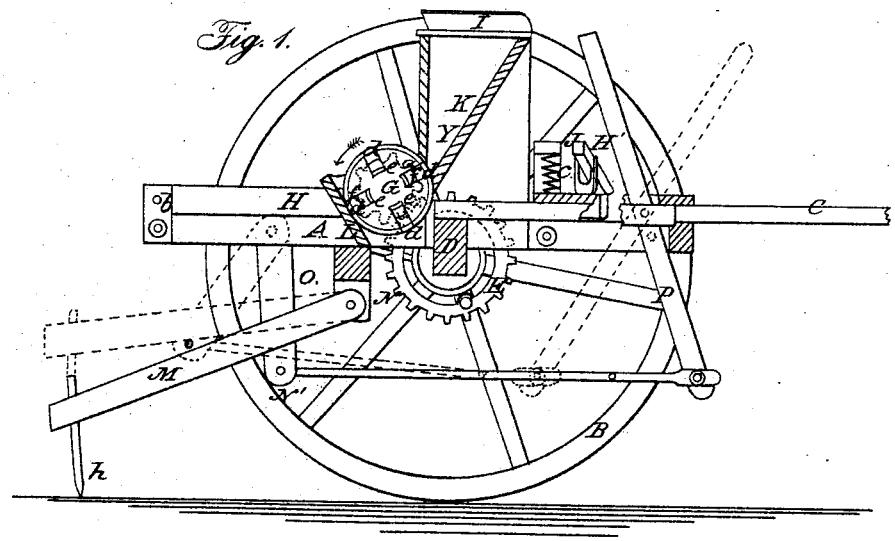
Figure 2:
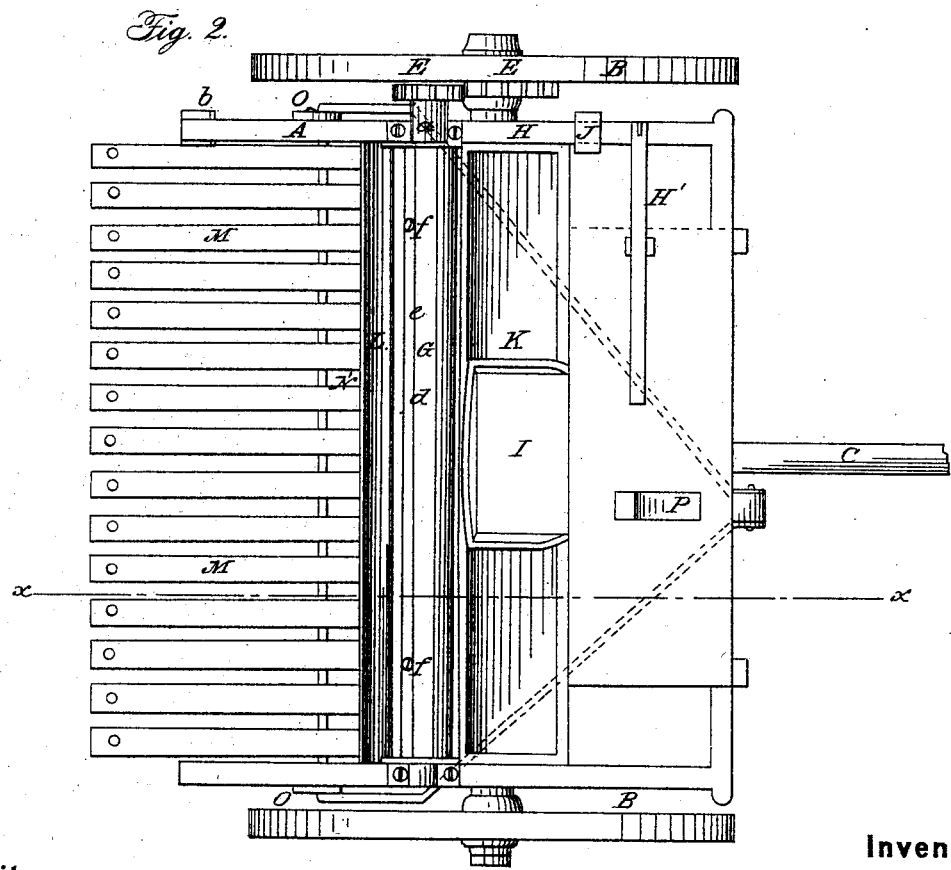

Figure 1 is a side sectional view of my invention, taken in the line $x\ x$, fig. 2.

Figure 2, a plan or top view of the same.

Similar letters of reference indicate like parts.

A represents a rectangular frame, which is mounted on two wheels B B′, and has a draught-pole, C, attached. The wheels B B′ are placed loosely on their axle D, and one of them, B, has a toothed wheel, E, attached concentrically to it, which wheel gears into a pinion, F, at one end of the shaft of a roller, G, one end of said shaft having its bearing $a$ on the frame A, and the other end having its bearing $a^\times$ on a bar, H, the rear end of which is connected by a hinge, $b$, to the frame A, and the front end connected to a lever, H′, which is on the front part of the frame A, and within convenient reach of the foot of the driver when on his seat I. The bar H works in a guide, J, in which a spiral spring, $c$, is placed, said spring having a tendency to keep the bar H down and the pinion F in gear with the toothed wheel E of the wheel B. The roller G is grooved longitudinally and radially, as shown at $d$, and each groove $d$ has a strip or bar, $e$, fitted in it and secured by set-screws $f$, by turning which the capacity of the grooves $d$ may, as regards depth, be varied as desired. K represents the seed-hopper or box, which extends the whole width of the frame A, as also does the roller G. The seed-hopper, however, is divided in this instance, but not necessarily so, by the supports $g$ of the driver's seat. The front side of the seed-hopper is inclined so as to leave a quite narrow discharge opening $h$ at its lower end, and this discharge opening is close to the periphery of the roller G, as shown clearly in fig. 1. Directly behind the roller G there is an inclined chute, L, which serves as a seed-distributer. M represents a series of bars, the front ends of which are fitted loosely on a rod, N, at the rear part of the frame A. These bars M are allowed to rise and fall freely, or work freely up and down, and they are provided each with a harrow-tooth, $h$. Underneath the bars M there is a transverse bar, N′, the ends of which pass through pivoted pendants O O, one at each side of the frame A, and extend forward and are attached to the lower end of a lever, P, at the front end of the frame A, and within convenient reach of the foot of the driver on seat I. As the machine is drawn along, the grooves $d$ of the roller G receive the seed from the hopper and carry it over in the direction indicated by the arrow 1, and discharge it upon the chute L, from which it falls in a scattered state upon the ground. The seed is harrowed in the ground by the teeth $h$, each tooth being allowed to rise and fall independently of the other, so that the teeth may conform to the inequalities of surface over which they may pass. The whole number of teeth may be raised simultaneously at any time by actuating the lever P. The roller G may be thrown out of gear at any time by raising the bar H, and thereby turning the pinion F out of gear with the wheel E.

I claim as new, and desire to secure by Letters Patent—

1. The roller G, provided with the grooves $d$ and adjustable bars $e$, in combination with the seed-hopper K and chute L, all arranged to operate substantially in the manner as and for the purpose set forth.

2. I also claim the harrow or covering-teeth $h$, attached to the bars M, which are fitted on the rod N, in combination with the transverse bar N′, arranged and connected to the lever P, to operate in the manner substantially as and for the purpose specified.

The above specification of my invention signed by me this fifteenth day of April, 1867.

B. A. SHEARER.

Witnesses:
GEO. W. SHEARER,
EZRA W. SHEARER.